United States Patent
Bowater et al.

(10) Patent No.: US 7,529,234 B1
(45) Date of Patent: May 5, 2009

(54) METHOD OF AND SYSTEM FOR SUPPORTING VOICE OVER INTERNET PROTOCOL (VOIP) MEDIA CODECS ON A VOICE PROCESSING SYSTEM

(75) Inventors: Ronald John Bowater, Romsey (GB); Philip Noel, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/131,204

(22) Filed: Jun. 2, 2008

(51) Int. Cl.
*H04J 3/16* (2006.01)
(52) U.S. Cl. ...................... 370/352; 370/356
(58) Field of Classification Search ............... 370/352, 370/356; 379/201.05
See application file for complete search history.

(56) References Cited

U.S. PATENT DOCUMENTS

| 2006/0003745 A1 | 1/2006 | Gogic |
| 2006/0239249 A1 | 10/2006 | Banner et al. |

*Primary Examiner*—Rasha S Al Aubaidi
(74) *Attorney, Agent, or Firm*—Dillon & Yudell LLP

(57) ABSTRACT

A method of supporting Voice over Internet Protocol (VOIP) media codecs on a voice processing system stores voice response segments in each of a plurality network native formats. Each of the network native formats corresponds to a media codec. The method receives a call from a caller over an IP network. The method determines a negotiated codec for the call. If the call requires a required voice response segment, the method retrieves the required voice segment in the network native format corresponding to the negotiated codec. The method then sends the required voice segment in the network native format corresponding to the negotiated codec to the caller over IP network. If the call includes a voice message from the caller, the method stores the voice message from the caller in the network native format corresponding to the negotiated codec. If the call requires retrieval of a voice mail message for the caller, the method retrieves the voice mail message. If the voice mail message is in the network native format corresponding to the negotiated codec, the method sends the voice mail message in the network native format corresponding to the negotiated codec to the caller over the IP network. If the voice mail message is not in the network native format corresponding to the negotiated codec, the method converts the voice mail message into the network native format corresponding to the negotiated codec, and sends the converted voice mail message in the network native format corresponding to the negotiated codec to the caller over the IP network.

1 Claim, 3 Drawing Sheets

| SEGMENT | G.729A | G.723.1 | G711 | iLBC | ... |
|---|---|---|---|---|---|
| seg1.wav | seg1.g729a | seg1.g7231 | seg1.g711 | seg1.ilbc | ... |
| seg2.wav | seg2.g729a | seg2.g7231 | seg2.g711 | seg2.ilbc | ... |
| seg3.wav | seg3.g729a | seg3.g7231 | seg3.g711 | seg3.ilbc | ... |
| ... | ... | ... | ... | ... | ... |

US 7,529,234 B1

METHOD OF AND SYSTEM FOR SUPPORTING VOICE OVER INTERNET PROTOCOL (VOIP) MEDIA CODECS ON A VOICE PROCESSING SYSTEM

BACKGROUND OF THE INVENTION

1. Technical Field

The present invention relates in general to the field automated voice processing systems, and more particularly to a method of and system for supporting VoIP media codecs on a voice processing system.

2. Description of the Related Art

Historically, there has been a clear separation between voice communication networks, such as telephone networks, and data networks, such as the Internet. Recently, however, with the advent of Internet telephony, there is then at least a partial merging of the systems. Many calls use a combination of a circuit-switched telephone network and a packet-switched IP network.

The interface between the telephone network and the IP network is a gateway. The gateway performs several functions, including call setup and protocol conversion. As part of the protocol conversion, the gateway converts voice signals from the telephone network to compressed signals appropriate for the IP network. Similarly, the gateway converts compressed signals received from the IP network to voice signals appropriate for the telephone network. The gateway uses codecs (compression/decompression algorithms) to perform the conversions. There are a number of standard codecs used in IP telephony. Many gateways do not support all standard codecs. Accordingly, during the call setup process, the gateways must agree to use the same codec.

Voice processing systems such as interactive voice response (WR) units and voicemail systems have become widespread. Many voice processing systems are connected directly to an IP network rather than to a public switched telephone network. Currently, however, voice processing systems work in "voice mode" rather than IP network "native mode." The presently existing voice processing systems use recorded voice segments and prompts, which are stored and played as wave files or the like. Presently existing voice mail systems record and playback messages from wave files. Thus, presently existing voice processing systems include an interface that uses codecs and digital signal processors to convert back and forth between voice and network native formats.

The current approach has a number of drawbacks. The amount of computing power needed to perform the compression and decompression in real time can be extremely large, especially the large number of channels are being handled simultaneously by the voice processing system. Such high-powered computing can be provided only by powerful main processors or digital signal processors on adapter cards. For a voice messaging system, the decompression when a voice messages stored in the recompression when a voice messages subsequently retrieved, all in real time, can create voice quality issues, as well as requiring significant processing.

SUMMARY OF TILE INVENTION

The present invention provides a method of supporting Voice over Internet Protocol (VoIP) media codecs on a voice processing system. The method stores voice response segments in each of a plurality network native formats, wherein each of the network native formats corresponds to a media codec. The method receives a call from a caller over an IP network. The method determines a negotiated codec for the call. If the call requires a required voice response segment, the method retrieves the required voice segment in the network native format corresponding to the negotiated codec. The method then sends the required voice segment in the network native format corresponding to the negotiated codec to the caller over IP network. If the call includes a voice message from the caller, the method stores the voice message from the caller in the network native format corresponding to the negotiated codec. If the call requires retrieval of a voice mail message for the caller, the method retrieves the voice mail message. If the voice mail message is in the network native format corresponding to the negotiated codec, the method sends the voice mail message in the network native format corresponding to the negotiated codec to the caller over the IP network. If the voice mail message is not in the network native format corresponding to the negotiated codec, the method converts the voice mail message into the network native format corresponding to the negotiated codec, and sends the converted voice mail message in the network native format corresponding to the negotiated codec to the caller over the IP network.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figures 1, 2:
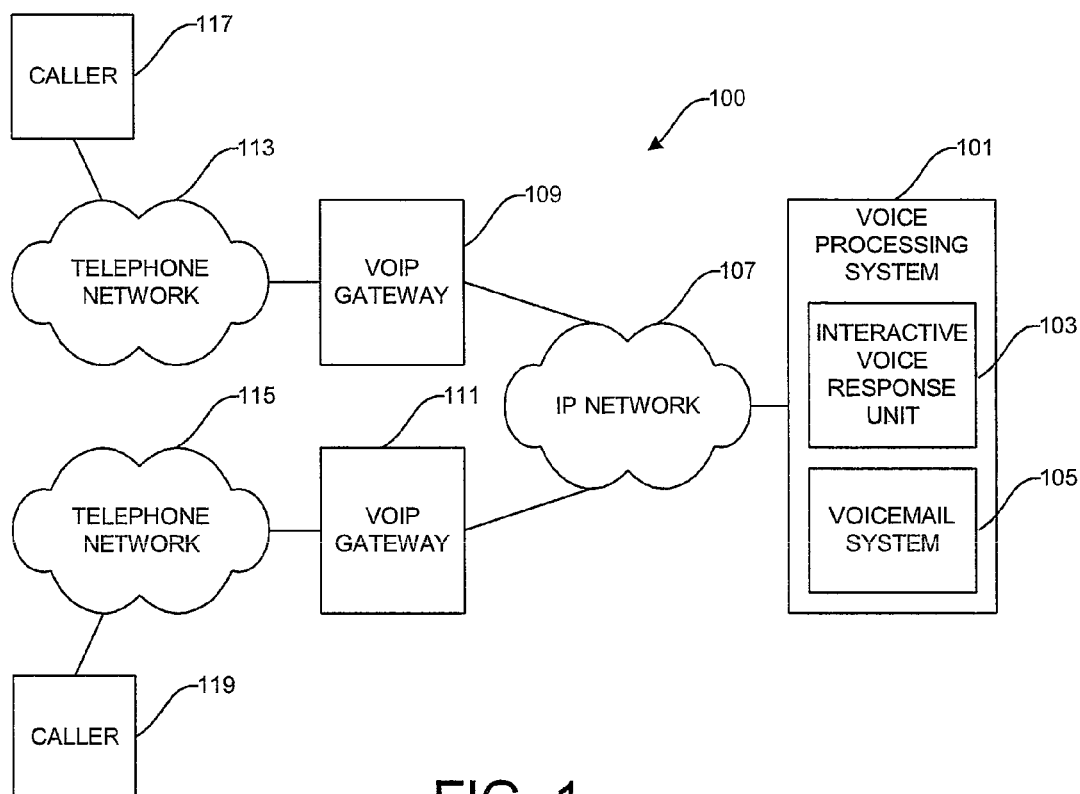
FIG. 1 is a block diagram of an embodiment of a system according to the present invention.
FIG. 2 illustrates an embodiment of a table of voice segments converted to network native codecs.

Referring now to drawings, and first to FIG. 1, an embodiment of a system according to the present invention is designated generally by the numeral 100. System 100 includes a voice processing system 101. Voice processing system 101 includes an interactive voice response (IVR) unit 103 and a voicemail system 105. IVR unit 103 is adapted to run scripts comprising voice segments interactively with voice commands and/or DTMF digit inputs. Voicemail system 105 is adapted to record and play back voice messages. Although IVR unit 103 may run scripts that are independent of voicemail system 105, IVR unit 103 and voicemail system 105 work together to process voice messages.

Voice processing system 101 is coupled to an Internet protocol (IP) network 107, such as the Internet. IP network 107 is coupled to a first voice over Internet protocol (VOIP) gateway 109 and a second VoIP gateway 111. First VoIP Gateway 109 is coupled to a first telephone network 113. Similarly, second VoIP Gateway 111 is coupled to a second telephone network 115. Telephone networks 113 and 115 may be public switched telephone networks that carry voice telephone calls. A first caller 117 is connected to telephone network 113. A second caller 119 is connected to second telephone network 115.

When first caller 117 places a call to voice processing system 101, first telephone network 113 uses routing tables to route the call to first VoIP Gateway 109. First VoIP gateway 109 uses an Internet telephony protocol such as session initiation protocol (SIP) to set up a call over IP network 107 to voice processing system 101. As part of the setup process, first VoIP Gateway 109 and voice processing system 101 negotiate a media codec for translating the voice signals native to first telephone network 113 to an IP network native format appropriate for communication with voice processing system 101. Examples of VoIP codecs include G.729A, G.723.1, G711, iLBC, etc. After call setup, first VoIP Gateway 109 uses the negotiated codec to translate voice signals received from first telephone network 113 to IP packets appropriate for IP network 107. Similarly, first VoIP Gateway 109 uses the negotiated codec to translate IP packets received from IP network 107 to voice signals appropriate for first telephone network 113.

When second caller 119 places a call to voice processing system 101 second VoIP Gateway 111 executes a similar process to set up the call. The media codec negotiated by second VoIP Gateway 111 and voice processing system 101 may be the same as or different from the one negotiated for the call between first caller 117 and voice processing system one. According to the present invention, voice processing system 101 sends voice segments from IVR unit to IP network 107 in the network native format appropriate for the negotiated codec rather than converting voice segments in real time. Voicemail system 105 saves voicemail messages in the network native format rather than converting the messages back and forth between voice and IP network native format in real time.

According to the present invention, each voice segment is converted using supported codecs to a network native version of the segment. Voice processing system 101 stores the converted segments. FIG. 2 illustrates a portion of a table 201 that maps voice segments to the converted IP network native versions of the segments. The segment file name is listed in a segment column 203. Columns 205-211 list the segment file names converted using codecs G.729A, G.723.1, G711, iLBC, respectively. Embodiments of the method of the present invention use a table such as table 201 to select network native segments. For example, if a script requires segment seg2.wav and the negotiated codec is G711, IVR unit 103 fetches segment seg2.g711.

Figure 3:
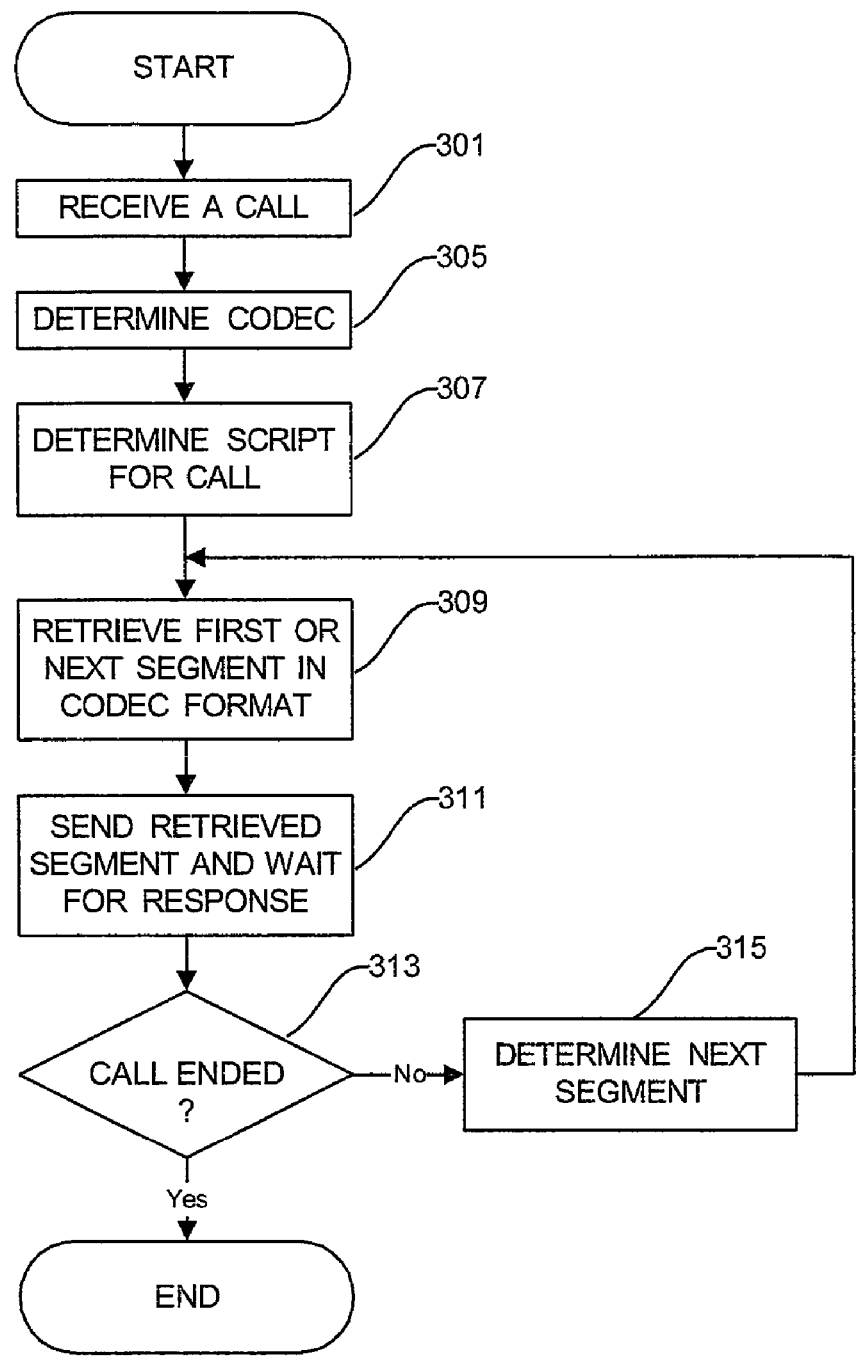
FIG. 3 is a flow chart of an embodiment of automated voice response unit processing according to the present invention; and, FIG. 4 is a flow chart of an embodiment of voicemail processing according to the present invention.

FIG. 3 is a flow chart of an embodiment of IVR unit processing according to the present invention. The method receives a call, at block 301. The method determines the codec negotiated for the call, at block 305. The method also determines the appropriate script for the call, at block 307. Then, the method retrieves the first or next segment from the script that has been previously translated according to the negotiated codec, as indicated at block 309. Then, the method sends the retrieved segment and waits for a response, as indicated at block 311. If the method determines, at decision block 313, that the called is not ended, the method determines the next segment, at block 315, and processing returns to block 309. Thus, IVR unit processing continues until the call ends, as determined at decision block 313. Throughout the call, the IVR unit sends segments that have been previously converted according to the initiating codec.

Figure 4:
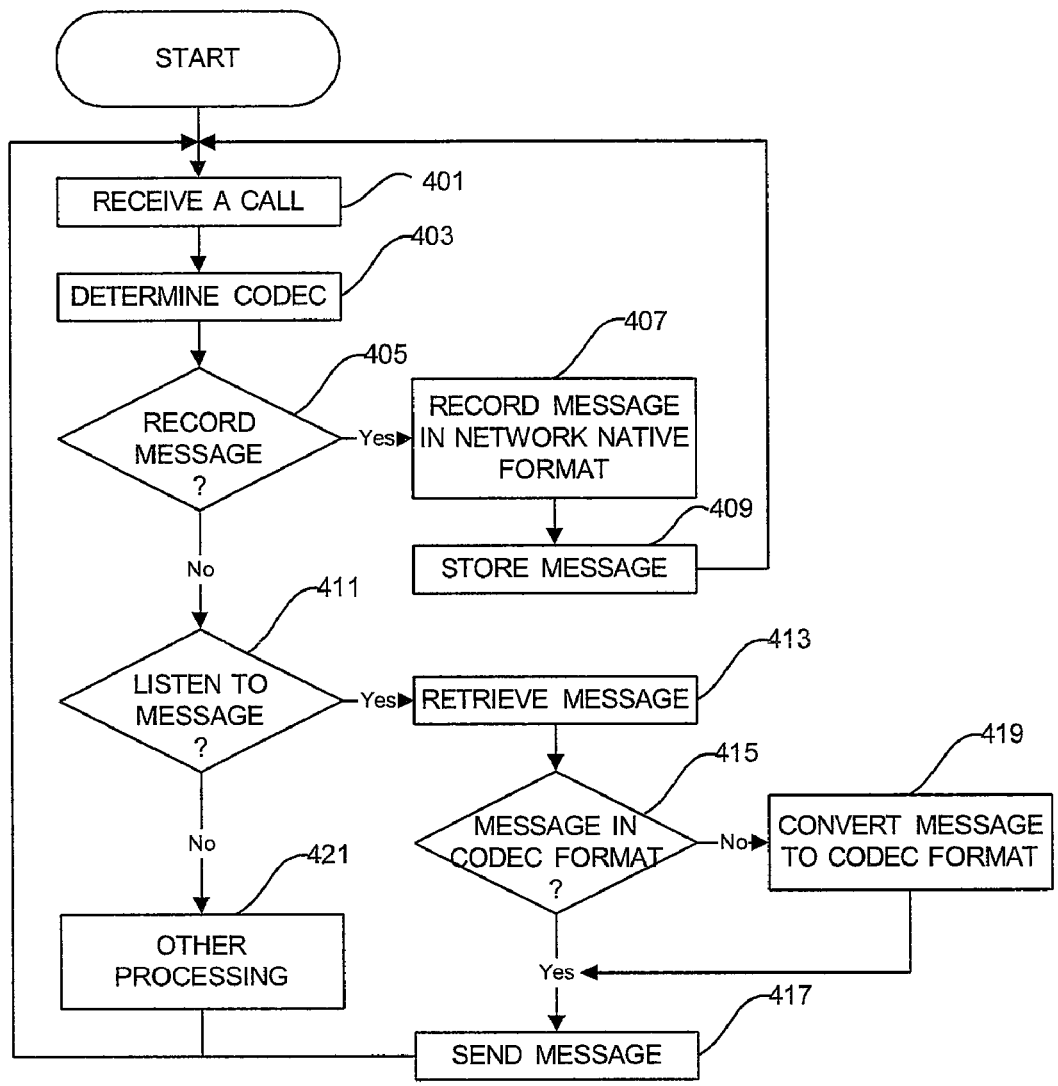

FIG. 4 is a flow chart of an embodiment of voicemail processing according to the present invention. The voicemail system receives a call, at block 401, and determines the negotiated codec at block 403. If, as determined at decision block 405, the caller wants to record a message, the system records the message in the network native format in which it is received from the IP network, as indicated at block 407. Then, the voicemail system stores the message in the network native format, as indicated at block 409. If, as determined at decision block 411, the caller wants to listen to a message, the voice system retrieves the message, as indicated at block 413. The retrieved message is in a network native format. The voicemail system determines, at decision block 415 if the format of the message is appropriate for the codec determined for the call. If so, the voicemail system sends the message, at block 417. If not, the voicemail system converts the message to the format appropriate for the negotiated codec, at block 419, and sends the message, at block 417. If the caller wishes to do something other than recording or listening to a message, the voicemail system performs other processing, as indicated at block 421.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of supporting Voice over Internet Protocol (VoIP) media codecs on a voice processing system, which comprises:

storing voice response segments in each of a plurality network native formats, each of said network native formats corresponding to a media codec;

receiving a call from a caller over an IP network;

determining a negotiated codec for said call;

if said call requires a required voice response segment;

retrieving said required voice segment in said network native format corresponding to said negotiated codec; and, sending said required voice segment in said network native format corresponding to said negotiated codec to said call over IP network;

if said call includes a voice message from said caller;

storing said voice message from said caller in said network native format corresponding to said negotiated codec;

if said call requires retrieval of a voice mail message for said caller;

retrieving said voice mail message;

if said voice mail message is in said network native format corresponding to said negotiated codec;

sending said voice mail message in said network native format corresponding to said negotiated codec to said caller over said IP network;

if said voice mail message is not in said network native format corresponding to said negotiated codec;

converting said voice mail message into if said voice mail message is in said network native format corresponding to said negotiated codec; and, sending said converted voice mail message in said network native format corresponding to said negotiated codec to said caller over said IP network.

\* \* \* \* \*